(12) United States Patent
O'Gorman et al.

(10) Patent No.: US 7,505,137 B2
(45) Date of Patent: Mar. 17, 2009

(54) OPTICAL WAVELENGTH METER

(75) Inventors: Neal O'Gorman, Dublin (IE); Ronan O'Dowd, Dublin (IE)

(73) Assignee: Tsunami Photonocs Ltd. (IE)

( * ) Notice: Subject to any disclaimer, the term of this patent is extended or adjusted under 35 U.S.C. 154(b) by 225 days.

(21) Appl. No.: 10/550,188

(22) PCT Filed: Mar. 24, 2004

(86) PCT No.: PCT/EP2004/003010

§ 371 (c)(1),
(2), (4) Date: Apr. 24, 2006

(87) PCT Pub. No.: WO2004/085980

PCT Pub. Date: Oct. 7, 2004

(65) Prior Publication Data

US 2006/0215167 A1    Sep. 28, 2006

(30) Foreign Application Priority Data

Mar. 24, 2003 (GB) ................................ 0306724.6

(51) Int. Cl.
*G01B 9/02* (2006.01)
(52) U.S. Cl. .................. 356/454; 356/480; 356/519
(58) Field of Classification Search ................ 356/454, 356/519, 480, 478; 372/29.023, 32
See application file for complete search history.

(56) References Cited

U.S. PATENT DOCUMENTS 5,729,347 A    3/1998    So
5,798,859 A    8/1998    Colbourne et al.
5,838,437 A *  11/1998   Miller et al. ................. 356/478
6,631,146 B2 * 10/2003   Pontis et al. .................. 372/20
2001/0021053 A1 * 9/2001 Colbourne et al. .......... 359/161

FOREIGN PATENT DOCUMENTS

| GB | 0223448.2 | 4/2004 |
|----|-----------|--------|
| WO | WO 00/54381 | 9/2000 |
| WO | WO 01/16569 | 3/2001 |

OTHER PUBLICATIONS

WO/2004/034532.*

* cited by examiner

*Primary Examiner*—Tarifur Chowdhury
*Assistant Examiner*—Jonathon D Cook
(74) *Attorney, Agent, or Firm*—Seyfarth Shaw LLP

(57) ABSTRACT

An optical wavelength meter for measuring wavelength of an optical beam includes two periodic out of phase fine optical filters (44, 45), using, for example Fabry Perot etalon filters, Fizeau filters, fibre Bragg gratings or photonic crystals. The phases of the periodic responses are arranged such that a peak (5109 or trough (511) of one response coincides with a slope (522) of the other response so that a slope portion of a response may always be chosen for measurement. A coarse filter (43) is provided to unambiguously define on which cycle of the periodic response of the fine filters a measured wavelength lies. Synchronized clock signals are provided to measure output of the filters using, for example, photodiodes (421, 422, 423, 424), at a rate of (1,000 to 10,000) wavelength measurements per second.

27 Claims, 7 Drawing Sheets

Quad Channel Optical Power Meter Block Diagram

OPTICAL WAVELENGTH METER

CROSS-REFERENCE TO RELATED APPLICATIONS

This application is derived from PCT application PCT/EP2004/003010 filed Mar. 22, 2004 and claims priority from UK patent application GB 0306724.6 filed Mar. 24, 2003.

BACKGROUND OF THE INVENTION

1. Field of the Invention

This invention relates to an optical wavelength meter.

2. Description of Related Art

Interferometer optical wavelength meters are known for measuring wavelengths in the optical C-band (1525-1565 nm) and optical L-band (1568-1610 nm) at a rate of approximately 10 measurements/sec. The use of linear and periodic optical filters for wavelength measurement is known from laser characterisation measurements. However, it is desirable to make faster optical wavelength measurements within these wavebands, for example, in VCSEL (vertical cavity surface emitter laser) production wafers having 20,000 devices need to be tested and in mass production of other active or passive optical components.

Referring to FIGS. 1 to 3, the measurement of optical wavelength using coarse and fine wavelength dependent filters is known from, for example, GB 0223448.2 for characterisation of tuneable lasers. A known arrangement 10 is shown in FIG. 1, in which a laser beam 11 from the tuneable laser 12 is split by a branched waveguide to direct the light beam under test to four pathways 131,132,133,134 leading respectively to: a reference photodiode 141; a coarse, monotonic or linear spectral filter 15 for the wavelength band of interest with an output to a second photodiode 151; and two periodic transmission filters 16,17, the respective outputs of which vary periodically with wavelength across free spectral ranges, having outputs to third and fourth photodiodes 161, 171, respectively. Typically the periodic filters 16,17 are Fabry Perot etalon filters having 50 GHz and 5 GHz free spectral range respectively, as shown in FIG. 2.

The course feature extraction filter 15 is a dielectric multilayer coating on a glass substrate with a monotonic frequency response across The C-band; while the medium and fine frequency identification filters 16, 17 are, for example, each formed from two parallel 95% dielectric minors with flat response.

Characteristics of the filters are shown in FIG. 2, in which a first plot 21 shows a linear response of the coarse filter 15, a second plot 22 shows a periodic response of the first periodic filter 16 with a free spectral range of 50 GHz and a third plot 23 shows a periodic response of the second periodic filter 17 with a free spectral range of 5 GHz.

In use, the wavelength of an emitted beam is determined approximately with the linear filter 15 by determining transmissivity of the filter at the given wavelength by comparing the power of the reference beam, as measured with the first reference photodiode 141, with the power of the beam transmitted through the filter 15 as measured by the second photodiode 151. The wavelength is determined with sufficient precision, e.g. is found to be in the range 24 shown in FIG. 2, to determine on which peaks 221, 231 of the periodic filter transmission curves 22, 23 the measured wavelength lies. As shown in FIG. 3, knowing on which peaks the wavelength lies, the wavelength 241 may be determined unambiguously from the outputs of the third and fourth photodiodes 161, 171.

It is an object of the present invention at least to ameliorate the aforesaid deficiency in the prior art.

BRIEF SUMMARY OF THE INVENTION

According to a first aspect of the invention, there is provided an optical wavelength meter for measuring wavelength of an optical beam comprising: coarse optical filter means and first optical power measurement means for measuring output of the coarse optical filter means and second optical power measurement means for measuring an unfiltered reference beam for coarse wavelength measurement; fine optical filter means comprising two periodic out-of-phase optical filters and third and fourth optical power measurement means for measuring output of the two out-of-phase optical filters for fine wavelength measurement, respectively; synchronized clock signal measurement means for synchronized measurement of the output of the first, second, third and fourth optical power measurement means; and processing means for determining the optical wavelength of the optical beam from the first and second optical power measurement means for coarse wavelength measurement and at least one of the third and fourth optical power measurement means for fine wavelength measurement.

Preferably, the optical wavelength meter further comprises beam splitting means for splitting the optical beam between the unfiltered reference beam and the coarse and fine optical filter means.

Advantageously, the coarse optical filter is a linear spectral filter.

Conveniently, the coarse optical filter comprises a dielectric multilayer coating on a glass substrate.

Preferably, the periodic optical filters comprise at least one of a Fabry Perot filter, a Fizeau filter, a fibre Bragg grating and a photonic crystal.

Advantageously, the two periodic out-of-phase optical filters are substantially 90° out of phase, i.e. in quadrature, such that peaks and troughs of a first of the filters coincide with substantially linear ranges between peaks and troughs of a second of the filters.

Conveniently, a phase offset between the two out of phase periodic optical filters is tuned by angle, temperature or pressure using a piezoelectric transducer.

Preferably, reflectivity of the periodic optical filters is substantially 25%.

Advantageously, the periodic optical filters have a finesse of substantially 2.

Conveniently, the periodic optical filters have a free spectral range of substantially 100 GHz.

Alternatively, the periodic optical filters have a free spectral range of substantially 50 GHz.

Conveniently, the periodic optical filters are parallel or wedge quartz etalons.

Advantageously, the optical wavelength meter further comprises calibration filter means and calibration filter output power measuring means.

Conveniently, the calibration filter means comprises an etalon filter.

Preferably, the etalon filter has precisely set or controllable free spectral range.

Advantageously, the free spectral range of the etalon filter is controllable and preset by rotation adjustment or temperature.

Preferably, a free spectral range of the calibration etalon filter differs just sufficiently from the free spectral range of the fine measurement filters that the calibration etalon filter is in phase only at top, middle and bottom wavelengths of a range of measurements of interest to obtain co-incident or Vernier-like maximum power at those wavelengths.

Conveniently, at least one of the optical power measurement means comprises a photodiode.

Advantageously, the synchronised clock signal measurement means comprises master module and slave modules to trigger measurement and read output of the power measurement means.

Preferably, the synchronised clock signal measurement means enables 40,000 points on each channel to be read in 2.5 seconds.

Advantageously, the synchronised clock signal measurement means enables 1,000 to 10,000 wavelength measurements/second.

Advantageously, the optical wavelength meter has a precision of substantially 2 picometers or substantially 250 MHz.

Preferably, the optical wavelength meter is arranged to make wavelength measurements in at least one of optical C-band, optical L-band and optical S-band.

Advantageously, the optical wavelength meter further comprises temperature control means for stabilising the optical components.

Conveniently, the temperature control means comprises a thermistor or thermocouple and fan cooling or Peltier temperature elements.

Advantageously, the optical wavelength meter is adapted for external triggering for synchronisation with external instrumentation.

According to a second aspect of the invention, there is provided a method of determining wavelength of an optical beam comprising: splitting the optical beam into first, second, third and fourth sub-beams; presenting the first sub-beam to reference first photodetector means; presenting the second sub-beam to linear filter means having an output to second photodetector means; presenting the third sub-beam to the first fine filter having an output to third photodetector means; presenting the fourth sub-beam to the second fine filter having an output to third photodetector means; using synchronized clock signal measurement means to read outputs from the first, second, third and fourth photodetector means; identifying from the first and second photodetector means outputs a limited range of wavelength in which the wavelength of the optical beam lies, to determine which of the first fine filter and the second fine filter has a greater sensitivity to wavelength in that limited range; and using the corresponding third or fourth photodetector means output, corresponding to the fine filter means having the greater sensitivity, to determine the wavelength of the optical beam.

Preferably, the first fine filter and the second fine filter are two periodic out of phase optical filters which are substantially 90° out of phase, i.e. in quadrature, such that peaks and troughs of a first of the filters coincide with substantially linear ranges between peaks and troughs of a second of the filters.

Conveniently, the method comprises the further steps of: providing a calibration etalon filter with conventional Airy function transmitting only at reference wavelength for calibration having a common maximum with the fine filter at a limited number of wavelengths within range; providing a broadband light source; and calibrating the processed readout from fine filter to the reference wavelength of calibration etalon filter.

Alternatively, the method comprises providing a tuneable laser tuned to the reference wavelength.

Conveniently, the method additionally comprises providing a fourth Airy etalon in ratio with the third Airy etalon to provide a common maximum at the limited number of wavelengths for a more defined optical transmitted bandwidth.

According to a third aspect of the invention, there is provided a computer program comprising code means for performing all the steps of the methods described above when the program is run on one or more computers.

BRIEF DESCRIPTION OF THE SEVERAL VIEWS OF THE DRAWINGS

The invention will now be described, by way of example, with reference to the accompanying drawings in which.

In the Figures, like reference numerals denote like parts.

DETAILED DESCRIPTION OF THE INVENTION

Figure 1:
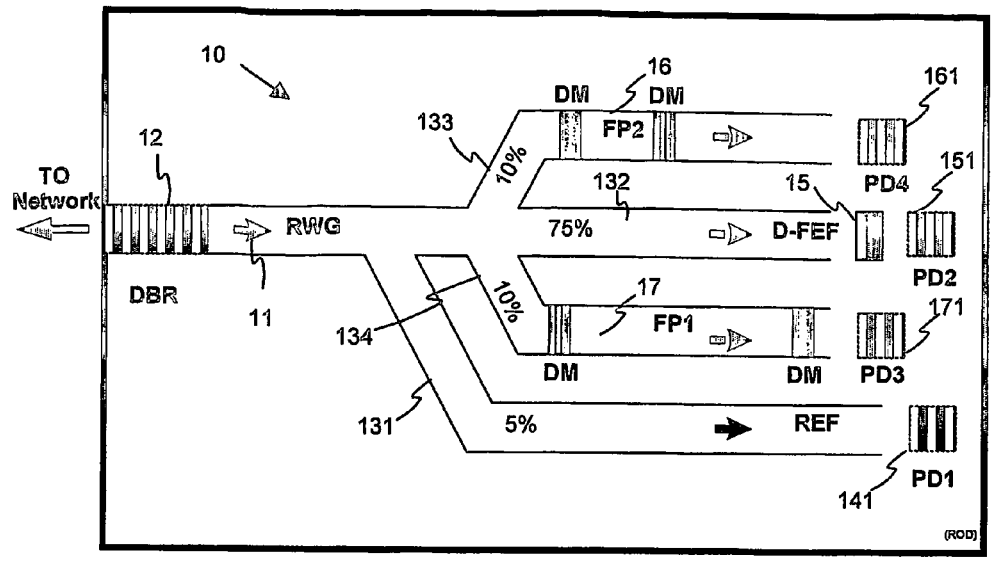
FIG. 1 is a schematic diagram of a known wavelength measuring arrangement for laser characterisation.
Figure 2:
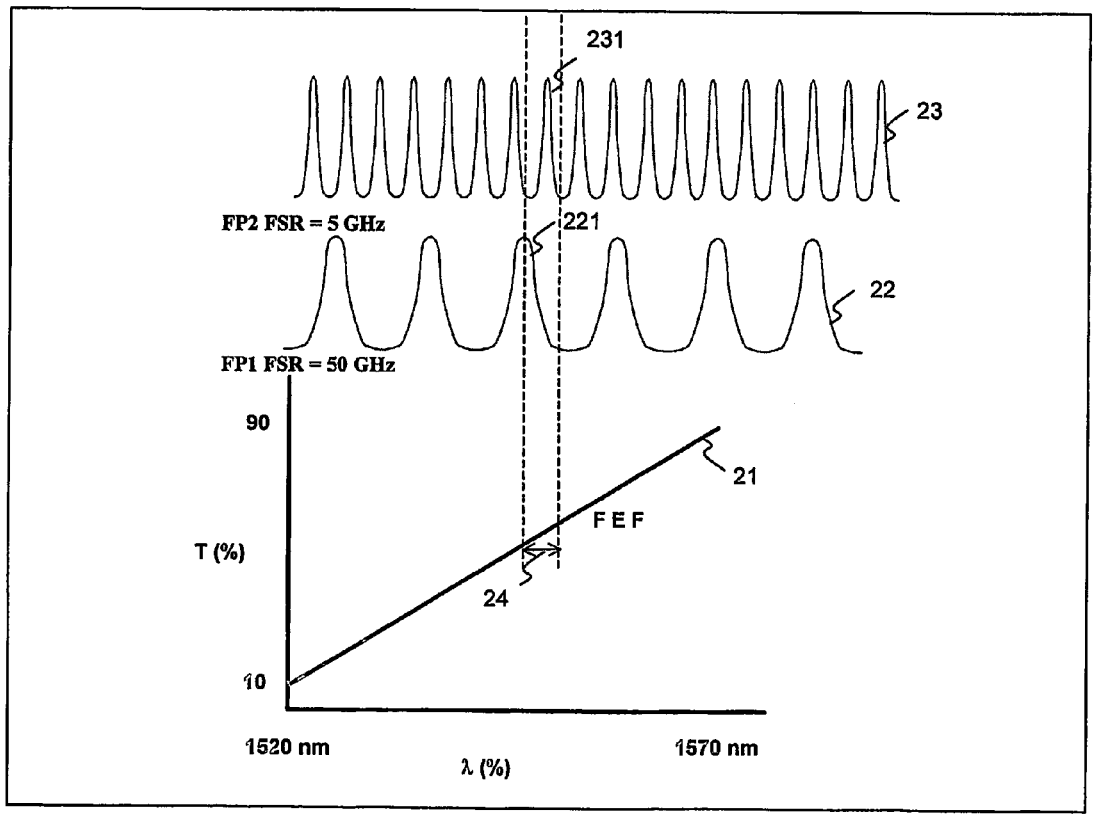
FIG. 2 shows plots of transmissivity versus wavelength or frequency for filters included in the arrangement of FIG. 1.
Figure 3:
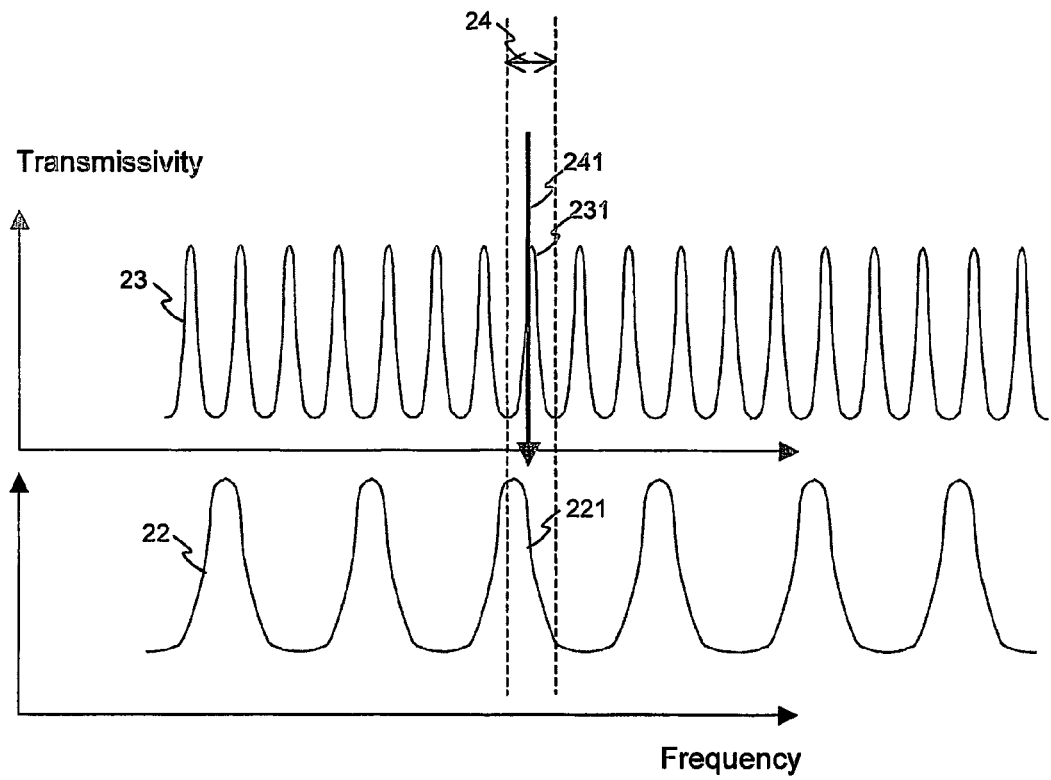
FIG. 3 shows in more detail two of the plots of FIG. 2.
Figure 4:
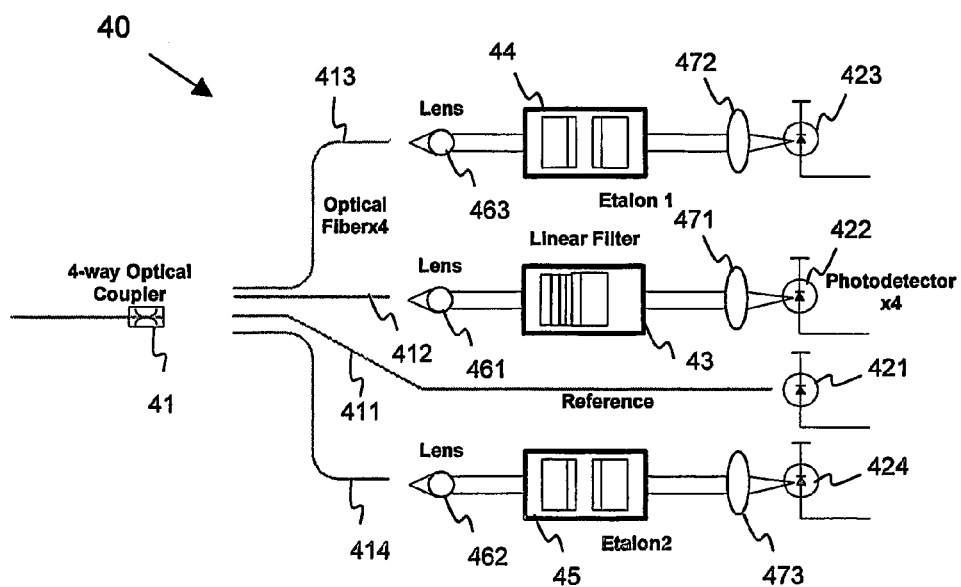
FIG. 4 is a schematic diagram of optical components of a wavelength meter according to the invention.

Referring to FIG. 4, which shows optical components 40 of a wavelength meter according to the invention, a beam splitter 41 directs a light beam under test to four pathways 411, 412, 413, 414 that incorporate respectively a reference photodetector 421; a coarse, monotonic or linear spectral filter 43 for the wavelength band of interest, an output of which is optically connected to a second photodetector 422 and two periodic transmission filters 44, 45 that vary in transmission across a free spectral range of typically 100 GHz. Output of the periodic filters 44, 45 are optically connected to photodetectors 423, 424 respectively. The function of the coarse feature extraction filter 43 is again provided by a dielectric multilayer coating on glass substrate with monotonic frequency response across the C-band; while the fine frequency identification filters are, for example, Fabry Perot (FP) or Fizeau type, created by, for example, parallel or wedge quartz etalons. Typically these FP etalon filters have 100 GHz down to 5 GHz free spectral range. The selection of 100 GHz allows for 250 MHz reading precision with the detector scheme described. More precisely, for optical C-band angle-tuned filters with 90 degree relative-phase offset, it is found that a fixed free spectral range of 100 GHz with a peak at 194 THz (mid C-band) has peaks offset by <267 MHz at top and bottom of C-band (196 and 192 THz). These values are input to a look up table to compensate for any resultant error. The optical components may be interconnected by pigtail optical fibres the linear filter having a first input lens 461 and the periodic filters 44, 45 having second and third input lenses 462, 463 respectively. Similarly, the second, third and fourth photodetectors have respective photodetector input lenses 471, 472, 473. Alternatively, the optical components may be interconnected by, for example, planar waveguides as in planar lightwave optics.

Figure 5:
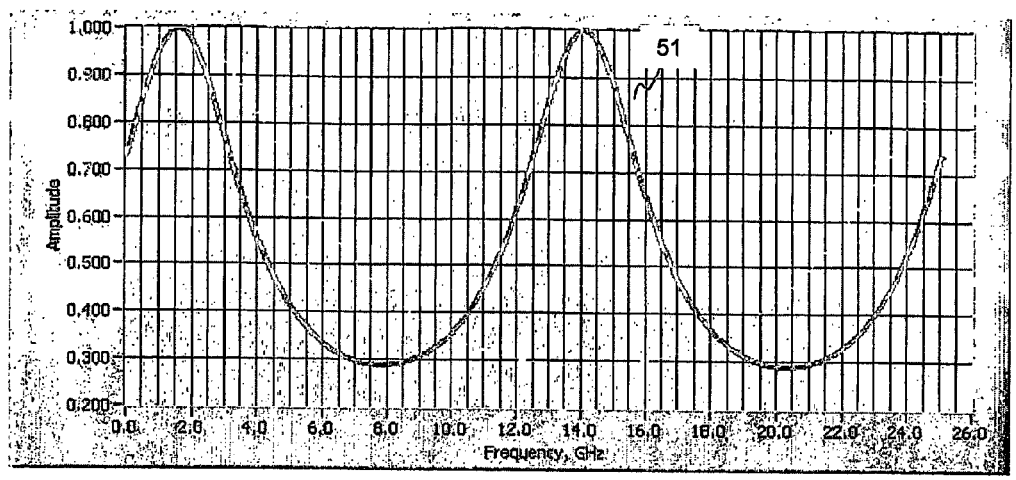
FIG. 5 is a transmissivity plot of a periodic filter of the wavelength meter of FIG. 4.
Figure 6:
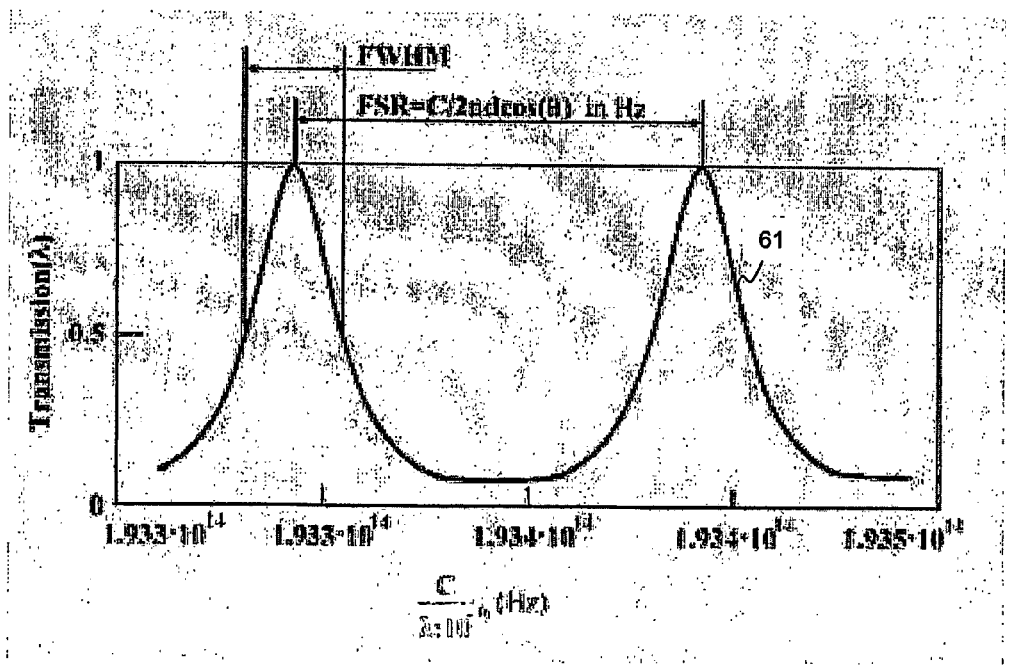
FIG. 6 is a transmissivity plot of a known periodic filter for comparision with the plot of FIG. 5.
Figure 7:
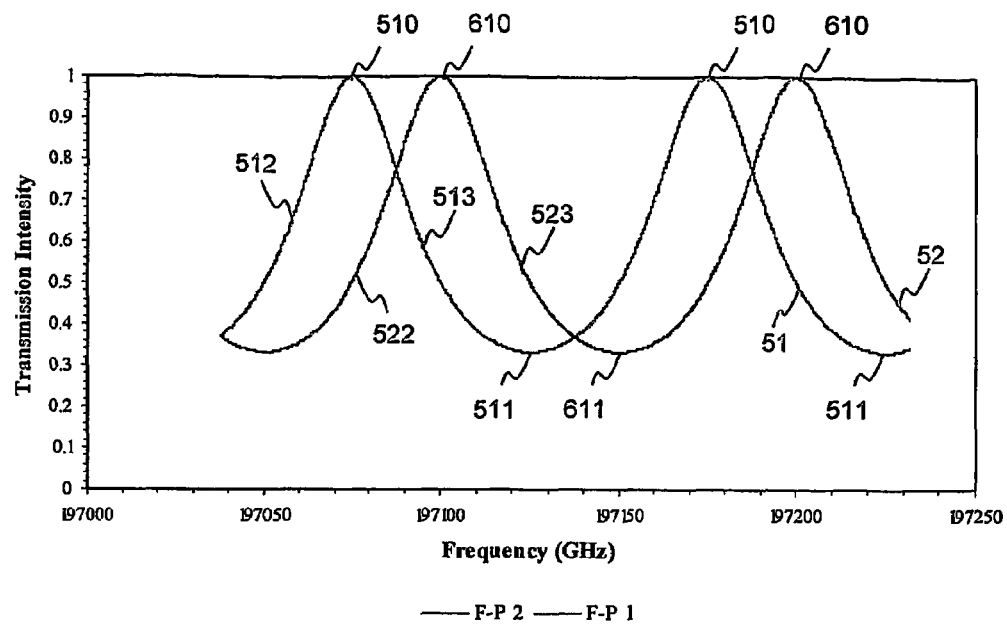
FIG. 7 shows two transmissivity plots of two periodic filters of the wavelength meter of FIG. 4, which are mutually 90° out of phase.
Figure 8:
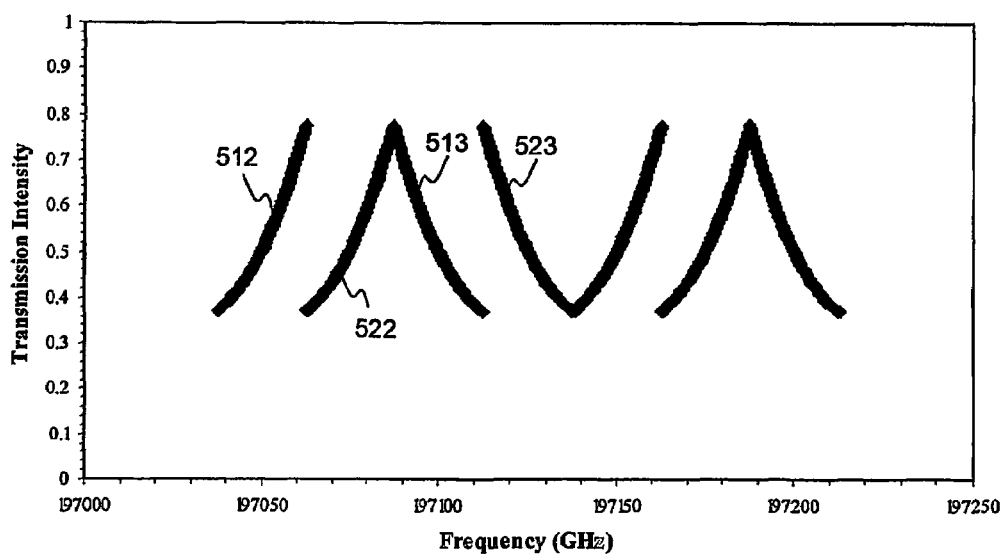
FIG. 8 shows sections of the plots of FIG. 7 used to obtain wavelength readings with the wavelength meter of the invention

The periodic filters have a low reflectivity of substantially 25% compared with the conventionally used 95% reflectivity and have a finesse of about 2, so that the etalon response 51, shown in FIG. 5, is closer to sinusoidal than a response 61 of a conventional Airy function, shown in FIG. 6, of a Fabry Perot etalon, where the finesse of the etalon is defined as the ratio of the free spectral range (FSR) to the width of the peaks, i.e. the fill width at half maximum height (FWHM). This means that effectively the etalon is similar to a two-beam interferometer while retaining the compactness and ruggedness of a glass substrate. Referring to FIGS. 7 and 8, the 90° offset of two periodic filter responses 51, 52 means that the peaks 510 and troughs 511 of a first filter, where slope is low, coincide with a steep-sloped substantially linear portions 522, 523 of a second filter, so that by use of the substantially linear portions 512, 522, 513, 523 of one filter which coincide with the substantially constant response portions 510, 610, 511, 611 of the other filter, good resolution is achieved at all wavelengths by suitable choice of periodic filter from which measurements are taken. This use of portions of the response curves of alternate filters effectively divides each of the 40 ranges of the linear response of the coarse filter, each range corresponding to a cycle of the periodic response of the fine filters, into four sub-ranges corresponding to portions of the responses 512, 522, 513, 523, as best seen in FIG. 8.

A precise offset of the two periodic filters is achieved by, for example, angle-tuning, temperature-tuning, or pressure-tuning but angle-tuning is preferred. If the middle of the measurement range, for example C or L band, is chosen for this setting, deviations from 90° at extreme ends of the range do not deteriorate performance. With a frequency scale range of 100 GHz, and angle tuning of 25 GHz, to provide the 90° offset, a precision of better than 250 MHz or 2 picometer has been achieved in wavelength measurement.

A fifth etalon filter, not shown, may be provided for calibrating the wavelength meter. The fifth filter is chosen to have a response with peaks co-incident with either of the other etalons 44, 45 only at, say, every nineteenth peak transmission wavelength. Since with a frequency scale range of 100 GHz there are approximately 40 peaks of the periodic filters in the C-band, co-incident or Vernier-like maximum power from such a pair may be arranged to appear only at top, mid and bottom of the C-band in this example, that is forty 100 GHz periodic cycles occupy the 4 THz span of the C-band.

Figure 9:
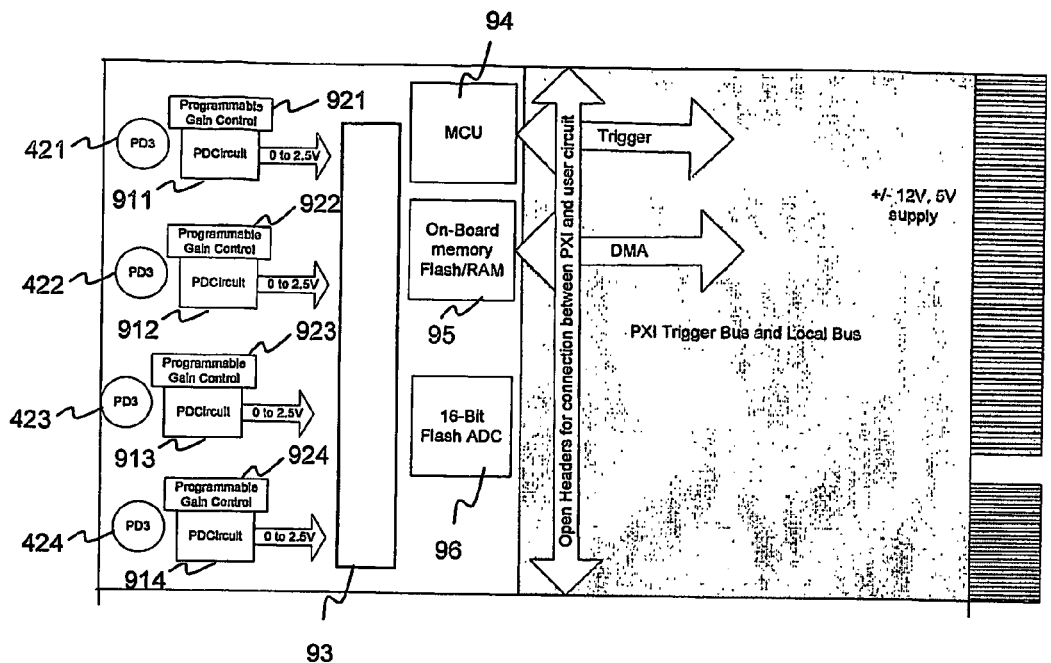
FIG. 9 is a schematic diagram of an experimental wavelength meter according to the invention.

A block-diagram layout of an experimental wavelength meter according to the invention is shown in FIG. 9. This uses a PXI-card, PXI being PCI (Peripheral Component Interconnect bus) extensions for Instrumentation, an open industry instrumentation specification. Sequencing of the photodetector output power measurements is achieved by the use of a PXI feature of a very precise electrical clock signal. The designed filter responses are used to compute wavelength from the four photodetector outputs in a time faster than the actual measurement.

The wavelength meter includes the first, second, third and fourth 421, 422, 423, 424 photodetectors connected to respective photodetector circuits 911, 912, 913, 914 for reading outputs of the photodetectors. Each of the photodetector circuits 911, 912, 913, 914 is controlled by a respective programmable gain control 921, 922, 923, 924. Outputs from the photodetector circuits 911, 912, 913, 914 are input to a multiplexer 93 and are sequenced at typically 5 microsecond delay. The wavelength meter also includes a microcontroller unit 94, a flash RAM 95 and an analog/digital converter 96.

Figure 10:
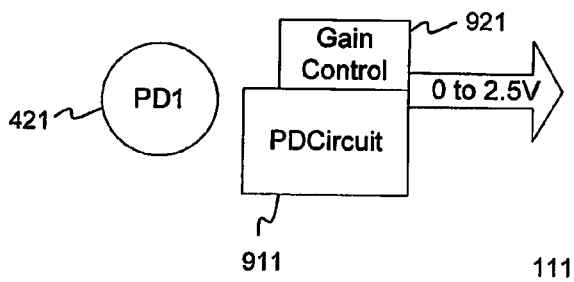
FIG. 10 is a schematic diagram of one of the photodetectors and associated circuitry of FIG. 9.

Referring to FIG. 10, the photodetector circuit 911, which is typical of all four photodetector circuits, supports an input range of 10 nanoA-100 milliA and an output range 0 to 2.5V. The circuit supports auto-ranging though digital I/O gain control 921 in the following seven steps:

|        | Min       | Max       |
|--------|-----------|-----------|
| Stage1 | 10 nanoA  | 100 nanoA |
| Stage2 | 100 nanoA | 1 microA  |
| Stage3 | 1 microA  | 10 microA |
| Stage4 | 10 microA | 100 microA|
| Stage5 | 100 microA| 1 milliA  |
| Stage6 | 1 milliA  | 10 milliA |
| Stage7 | 10 mA     | 100 mA    |

The circuit also supports dark current and gain calibration requirements. Data input intervals are 100 micro-seconds and a channel to each photodetector 421, 422, 423 and 424 is independent.

Figure 11:
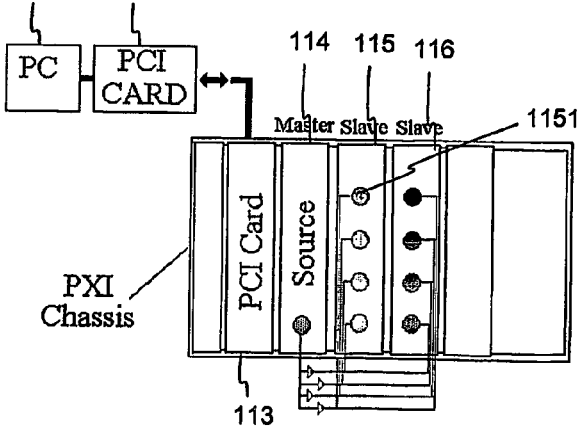
FIG. 11 is a schematic diagram showing interconnections of a wavelength meter according to the invention with an external personal computer.

Referring to FIG. 11, the wavelength meter may be controlled by a personal computer 111 using a PXI interface, that is the personal computer 11 is provided with a first PCI interface card 112 connected to a second PCI interface card 113 in the wavelength meter. A source (master) module 114 outputs 40,000 points to each channel 1151 on slave module 115. The slave module 116 simultaneously read inputs from each of the photodetectors. Any one of the modules can act as master and all others are synchronised with the master module. This means that the slave module 116 needs to have a capability of storing a minimum of 160,000 data points. This measurement process takes approximately 2.5 seconds from triggering the source of 40,000 points to reading 40,000 points on each channel. In order to carry out the operation, the modules are configured for triggering with one master and multiple slaves. Memory is reserved on the slave modules RAM prior to execution. For example the source could be set-up as the master module while all other modules are slaves. The PXI mainframe into which cards are slotted using edge connectors may have an independent PC chip set. The operation is executed as follows:

Initialise slave modules 115, 116.
Slave modules 115, 116 are activated to accept trigger.
Master module 114 or separate triggering module initiates the operation.
Slave modules 116 start reading inputs for each channel.
Slave modules 116 store readings in 'module' memory 95, i.e. 160,000 points per operation.
The slave module 116 sets a status bit indicating completion of the operation.
An application on the personal computer 111 polls the status bit until the operation is complete.
Once completed data from the slave module 116 is read from the onboard RAM 95 to the personal computer application. 2 Mbyte of RAM is provided to store data tables for stimulus and measurement data.

The gain of each photodetector circuits 911, 912, 913, 914 is automatically adjusted, by the associated programmable gain control 921, 922, 923, 924, determined by a detected range in which output from the respective photodetector falls. To enable such auto-ranging, the maximum slope resolution of the photodetector circuit is 30 dB per picometer. Each measurement interval is 100 microseconds within which the card auto-ranges for the input data and reads the value through the analog to digital converter. An alternative option is to auto-range first via a log-amplifier for initial signal level assessment.

Conversion of photodetector power measurements to wavelength may be achieved using one or more look-up tables which store the filter characteristics or by using a mathematical function to represent filter responses.

The wavelength meter provides fast wavelength measurements spanning the optical 'C' band and/or possibly the optical 'L' band and/or possibly the optical S-band. In particular, the invention may be applied to visible and near IR radiation. Alternatively the wavelength meter may span some other optical band of order 4 THz. An embodiment of the instrument is based on the PXI modular instrumentation standard and occupies two PXI slots.

The key advantage of the invention is speed of measurement. Traditional interferometer-based wavelength measurement techniques are accurate but relatively slow (~10 measurements/sec), the wavelength meter is less accurate but capable of much higher speed (1,000 to 10,000 measurements/sec) and has no moving parts or complicated features such as a sine-drive.

Figure 12:
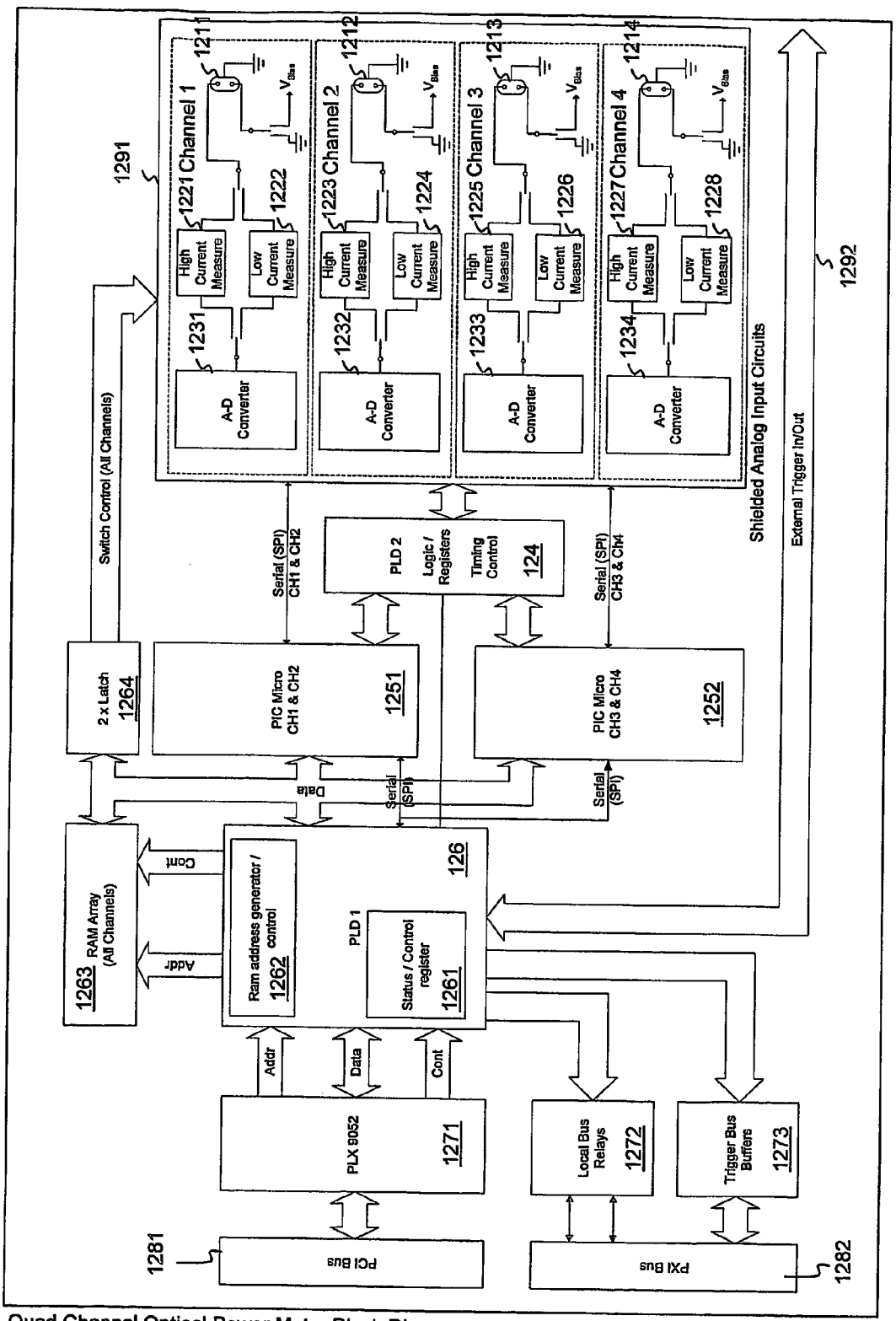
FIG. 12 is a schematic diagram of electronic components of a wavelength meter according to the invention.

In one embodiment, shown in FIG. 12, electronics for the wavelength meter are based on an improvement on an existing PXI two-channel optical power meter (PX2000-306) available from PX Instrument Technology Ltd., Ireland. Because the wavelength meter optics require four channels of optical power to be measured simultaneously, the two channel unit requires modification to four channels.

The optics used for the wavelength meter require temperature control. This is provided as a plug-on module, not shown in FIG. 12. This will allow the wavelength meter module according to the invention to be deployed independently as a single slot module.

The modified design of optical power meter uses an additional PIC microprocessor 1252 and an additional programmable logic device (PLD) 124 to control the additional two channels. A 2MB memory 1263 on the existing module is shared between the 4 channels. Inputs to the modified quad optical power meter are from four InGaAs photodiodes, or other diode type suited to the waveband of interest, 1211, 1212, 1213, 1214 fitted in an optics box.

Referring to FIG. 12, the photodiodes, their associated analog measurements circuits and analog to digital converters are located in a shielded enclosure 1291. Considering the first channel, the other three channels being identical to the first channel, the InGaAs photodiode 1211 has an input alternately switchably connectable to earth or a bias voltage. An output of the photodiode is alternately switchably connectable to a high current measurement circuit 1221 and a low current measurement circuit 1222. Outputs of the high current measurement circuit 1221 and the low current measurement circuit 1222 are switchably connectable to an input of a analog digital converter 1231. The inputs of the photodiode 1211 may be connected to earth and the output to low current measurement for measurement of the dark current and the input connected to the bias voltage and to the high current measurement to make a reading. Dark currents are measured before each reading or before each batch of readings whose size/interval is programmable. If the output level is below 1 microwatt a sequence of ten measurements is taken and averaged; this slows the measurement rate to 1000 wavelengths per second. If the output level is above 1 milliwatt a higher bias voltage is switched in to ensure linearity.

Outputs from the first and second channel analog digital converters 1231, 1232 are connected by a first serial connection to a first PIC microprocessor 1251 and outputs from the third and fourth channel analog digital converters 1233, 1234 are connected by a second serial connection to a second PIC microprocessor 1252.

There is also a parallel data interconnection between the outputs of the analog-digital converters 1231, 1232, 1233, 1234 and a second programmable logic device (PLD) 124, and parallel digital interconnections between the second PLD 124 and the first PIC microprocessor 1251 and the second PIC microprocessor 1252 respectively.

The first PIC microprocessor 1251 and the second PIC microprocessor 1252 are both serially connected to a first PLD 126. The first PIC microprocessor 1251 and the second PIC microprocessor 1252 are also interconnected by a parallel data bus to the first PLD 126 and to a RAM array 1263. The first PLD 126 includes a status/control register 1261 and a RAM address generator/control module 1262. The first PLD 126 has an address bus output and a control bus output to the RAM Array 1263. The RAM array is also interconnected by a parallel data bus to a 2× latch 1264 which has a data bus switch control output to the photodiode, current measurement and analog/digital converter circuits. The first PLD 126 has a first parallel bus output to local bus relays 1272 and a second parallel bus output to trigger bus buffers 1273. The local bus arrays 1272 have serial connections to a PXI bus 1282 and the trigger bus buffers have a parallel bus connection to the PXI bus 1282. The first PLD 126 also has a parallel bus input/output 1292 to an external trigger.

The first PLD 126 is interconnected by a parallel data bus to a PCI bus interface micro-controller chip (PLX 9052) 1271 for controlling data transfer via a bus. The first PLD 126 also has address bus and control bus inputs from the PLX 9052 and the PLX 9052 has a parallel bus interconnection to a PCI bus 1281.

A Trigger Mode is provided to set the module into a mode in which an external trigger input is enabled, via the external trigger bus 1292. An external trigger can be connected to the 'Trigger In' (pin 8) input on a 9-way 'D' connector on a front panel. With the external trigger mode enabled, holding this signal in a low state causes the module to wait in a measurement cycle, driving it high allows the measurement sequence to continue. This feature is used to allow synchronization with external instrumentation.

Figure 13:
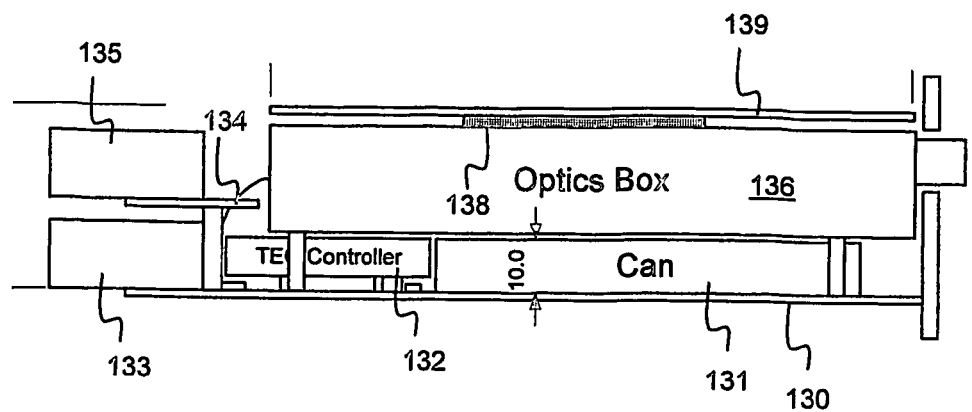
FIG. 13 is a schematic side view of packaging of the wavelength meter of FIG. 12.
Figure 14:
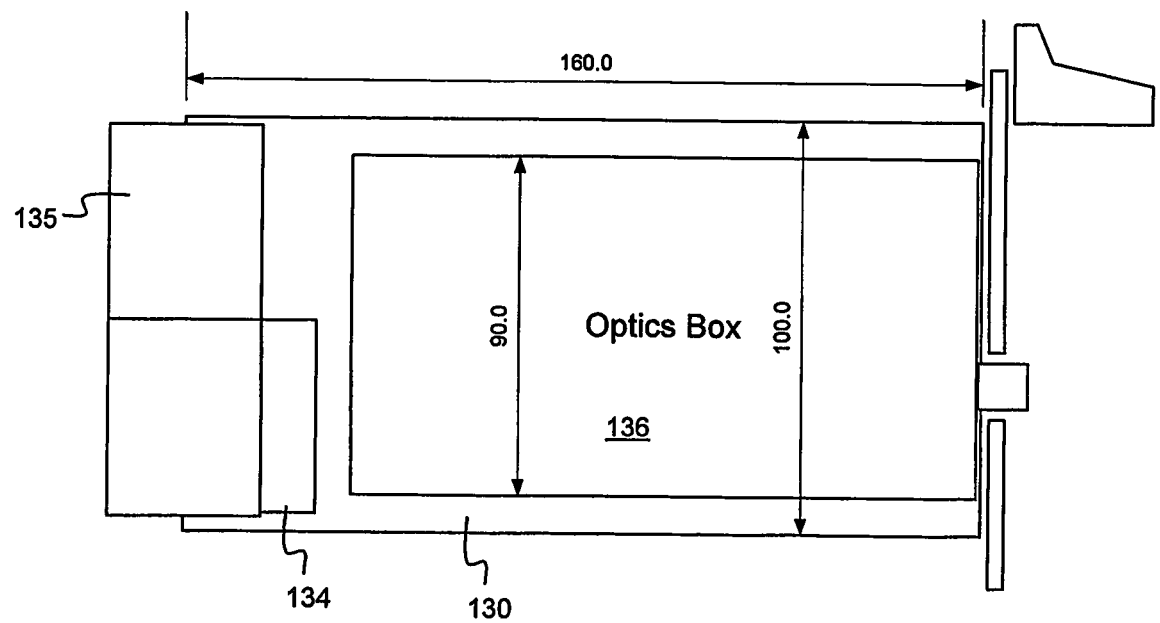
FIG. 14 is a schematic plan view of the packaging of the wavelength meter of FIG. 13.

A side view of packaging of the wavelength meter, including the optical components shown in FIG. 4 and the electronics components shown in FIG. 12 is shown in FIG. 13 and a plan view in FIG. 14, from which it can be seen that a can 131 containing the electronics circuit shown in FIG. 12 is mounted on a substrate 130. Mounted on the substrate 130 proximate one end of the can 131 is a TEC controller 132 for temperature control feedback from a thermistor to a Peltier device. Proximate an end of the TEC controller remote from the can 131 there is a first PXI edge connector 133 mounted on the substrate 130 for external connection to the analog/digital converters 1231, 1232, 1233, 1234. Mounted above the first PXI connector 133 on a sub-substrate 134 is a second PXI connector 135 for external connection to an optics box 136. The optics box 136 is mounted above the can 131 partially covering the TEC controller. The optics box 136 contains the micro-optics components shown in FIG. 4, namely a beam splitter, etalon filters, a coarse filter each in its own mini-package with fibre in/out; and the photodiodes. The optics box 136 is surmounted by a thermal environment substrate 139 spaced from the optics box by a thermal spacer 138.

In use procedural steps to measure wavelength are as follows:

[1] The beam is split and the four photo-detector currents are measured rapidly.

[2] The linear filter output first identifies that range in the total wavelength band in which the beam wavelength lies. There are typically forty FSR ranges with four sub-ranges each in a spectral band of a C-band wavelength meter. The sub-range with its slope, rising 512, 522 or falling 513, 523 (FIG. 8), is identified.

[3] Output from the appropriate one of the pair of in-quadrature etalon detectors is measured and the wavelength is output from that etalon's look-up table for power to wavelength conversion.

The procedural steps for calibration of the wavelength meter are:

[1] A calibration third etalon is provided having high reflectivity to give a conventional Airy function response. The third etalon also has an FSR that is in a ratio with the other etalons to provide a common maximum throughput at only three, for example, points in the spectral band of the meter. An Airy function response, as shown in FIG. 6, which is sharper than the responses of the fine filters, produces a more defined optical bandwidth that transmits only at the reference wavelength.

[2] A broadband light source provides a maximum common transmission at this reference wavelength and the pair of quadrature etalon circuits are re-calibrated to read that wavelength.

Alternatively, a narrowly-tunable laser may be in-built with this option that is thermally or electrically fine-tuned to the common filter reference value to provide a calibration signal for the instrument.

A further, more expensive, refinement incorporates a calibration fourth etalon, also of Airy type, that has an FSR that is in a ratio with the other Airy etalon to provide a common maximum throughput at only three, for example, points in the spectral band of the meter. The sharper Airy function pair produces an even more defined optical bandwidth that transmits only at a further reduced bandwidth reference wavelength.

Depending on the combination of three or four etalons the detectors readings are appropriately sequenced and processed from the relevant look-up tables.

Although the wavelength has been described using periodic filters with free spectral range of 100 GHz, where a higher resolution of the wavelength measurement is desired, 50 GHz or lower FSR etalon filters may be used, in which case the total number of sub-ranges in the spectral band of the meter, and look-up table data, will increase accordingly.

In order to stabilize the optics, the filter housings are maintained in close-fitting metal enclosures that have thermal sensing electronics (e.g. a thermistor) with feedback to a fan-assisted environment. An enclosed environment with Peltier temperature elements is another variation.

The invention provides the advantages of a measurement speed 1,000 to 10,000 faster than conventional instruments and without moving parts. The optics components include rugged etalon filters of low finesse. Using a wavelength meter according to the invention, VCSELs (vertical cavity surface emitting lasers), for example, can be calibrated at wafer stage during volume production where a wafer may carry 20,000 or more lasers. There are many other single frequency optical signals that require fast measurement, e.g. monitoring dense WDM networks, which would also benefit from the invention.

The invention claimed is:

1. An optical wavelength meter for measuring an optical wavelength of an optical beam comprising:
    a) coarse optical filter means and first optical power measurement means for measuring output of the coarse optical filter means and second optical power measurement means for measuring an unfiltered reference beam for coarse wavelength measurement;
    b) fine optical filter means comprising first and second periodic optical filters in quadrature having a finesse of substantially 2 and free spectral range of substantially 100 GHz, such that peaks and troughs of the first filter coincide with substantially linear ranges between peaks and troughs of the second filter, and third and fourth optical power measurement means for measuring output of the first and second periodic optical filters in quadrature for fine wavelength measurement, respectively;
    c) beam splitting means for splitting the optical beam between the unfiltered reference beam and the coarse and fine optical filter means;
    d) synchronized clock signal measurement means for synchronized measurement of the output of the first, second, third and fourth optical power measurement means;
    e) processing means for determining the optical wavelength of the optical beam from a predetermined transmissivity-wavelength relationship of the coarse filter and the first and second optical power measurement means for coarse wavelength measurement and from predetermined transmissivity-wavelength relationships of the first and second periodic optical filters and at least one of the third and fourth optical power measurement means for fine wavelength measurement; and
    f) calibration filter means comprising an etalon filter and calibration filter output power measuring means;
    wherein free spectral range of the etalon filter differs just sufficiently from the free spectral range of the periodic optical filters that the etalon filter is in phase only at top, middle and bottom wavelengths of a range of measurements of interest to obtain co-incident or Vernier-like maximum power at those wavelengths.

2. An optical wavelength meter as claimed in claim 1, wherein the coarse optical filter means comprises a linear spectral filter.

3. An optical wavelength meter as claimed in claim 1, wherein the coarse optical filter means comprises a dielectric multilayer coating on a glass substrate.

4. An optical wavelength meter as claimed in claim 1, wherein the periodic optical filters comprise at least one of a Fabry Perot filter, a Fizeau filter, a fibre Bragg grating and a photonic crystal.

5. An optical wavelength meter as claimed in claim 1, wherein a phase offset between the first and second periodic optical filters in quadrature is tuned by angle, temperature or pressure using a piezoelectric transducer.

6. An optical wavelength meter as claimed in claim 1, wherein reflectivity of the periodic optical filters is substantially 25%.

7. An optical wavelength meter as claimed in claim 1, wherein the periodic optical filters have a free spectral range of substantially 50 GHz instead of substantially 100 GHz.

8. An optical wavelength meter as claimed in claim 1, wherein the periodic optical filters are parallel or wedge quartz etalons.

9. An optical wavelength meter as claimed in claim 1, wherein the etalon filter has precisely set or controllable free spectral range.

10. An optical wavelength meter as claimed in claim 1, wherein the free spectral range of the etalon filter is controllable and preset by rotation adjustment or temperature.

11. An optical wavelength meter as claimed in claim 1, wherein at least one of the optical power measurement means comprises a photodiode.

12. An optical wavelength meter as claimed in claim 1, wherein the synchronised clock signal measurement means comprises master module and slave modules to trigger measurement and read output of the optical power measurement means.

13. An optical wavelength meter as claimed in claim 12, wherein the synchronised clock signal measurement means enables 40,000 points on each of a plurality of channels to be read in 2.5 seconds.

14. An optical wavelength meter as claimed in claim 1, wherein, the synchronised clock signal measurement means enables 1,000 to 10,000 wavelength measurements/second.

15. An optical wavelength meter as claimed in claim 1, having a precision of substantially 2 picometers or substantially 250 MHz.

16. An optical wavelength meter as claimed in claim 1, arranged to make wavelength measurements in at least one of optical C-band, optical L-band and optical S-band.

17. An optical wavelength meter as claimed in claim,1, further comprising temperature control means for stabilising optical components thereof.

18. An optical wavelength meter as claimed in claim 17 wherein the temperature control means comprises a thermistor or thermocouple and fan cooling or Peltier temperature elements.

19. An optical wavelength meter as claimed in claim 1, adapted for external triggering for synchronisation with external instrumentation.

20. An optical wavelength meter as claimed in claim 1, arranged to measure infrared or visible wavelengths.

21. A method of determining wavelength of an optical beam comprising:
   a) splitting the optical beam into first, second, third and fourth sub-beams;
   b) presenting the first sub-beam to reference first photodetector means;
   c) presenting the second sub-beam to coarse filter means having an output to second photodetector means;
   d) presenting the third sub-beam to a first fine periodic filter having an output to third photodetector means;
   e) presenting the fourth sub-beam to a second fine periodic filter having an output to fourth photodetector means, wherein the first fine periodic filter and the second fine periodic filter are in quadrature and have a finesse of substantially 2 and free spectral range of substantially 100 GHz, such that peaks and troughs of the first fine periodic filter coincide with substantially linear ranges between peaks and troughs of the second fine periodic filter;
   f) using synchronized clock signal measurement means to read outputs from the first, second, third and fourth photodetector means;
   g) identifying from predetermined transmissivity-wavelength characteristics of the coarse filter means and the first and second photodetector means outputs a limited range of wavelength in which the wavelength of the optical beam lies, to determine from their predetermined transmissivity-wavelength sensitivities which of the first fine filter and the second fine filter has a greater sensitivity to wavelength in that limited range;
   h) using predetermined transmissivity-wavelength characteristics of the first or second fine filter having the greater sensitivity in the limited range of wavelength and the corresponding third or fourth photodetector means output, corresponding to the fine filter means having the greater sensitivity, to determine the wavelength of the optical beam;
   i) providing a calibration etalon filter with conventional Airy function transmitting only at a reference wavelength for calibration having a common maximum with the first and second fine periodic filters respectively at a limited number of wavelengths within range;
   j) providing a broadband light source or a tuneable laser tuned to the reference wavelength; and
   k) calibrating the processed readout from fine periodic filters to the reference wavelength of the calibration etalon filter.

22. A method as claimed in claim 21, wherein step i) additionally comprises providing a fourth Airy etalon in ratio with the calibration etalon filter with conventional Airy function to provide a common maximum at the limited number of wavelengths for a more defined optical transmitted bandwidth.

23. A method as claimed in claim 21, for measuring infrared or visible wavelengths.

24. An optical wavelength meter for measuring an optical wavelength of an optical beam comprising:
   a) coarse optical filter means and first optical power measurement means for measuring output of the coarse optical filter means and second optical power measurement means for measuring an unfiltered reference beam for coarse wavelength measurement;
   b) fine optical filter means comprising first and second periodic optical filters in quadrature having a finesse of substantially 2 and free spectral range of substantially 100 GHz, such that peaks and troughs of the first filter coincide with substantially linear ranges between peaks and troughs of the second filter, and third and fourth optical power measurement means for measuring output of the first and second periodic optical filters in quadrature for fine wavelength measurement, respectively;
   c) beam splitting means for splitting the optical beam between the unfiltered reference beam and the coarse and fine optical filter means;
   d) synchronized clock signal measurement means for synchronized measurement of the output of the first, second, third and fourth optical power measurement means;
   e) processing means far determining the optical wavelength of the optical beam from a predetermined transmissivity-wavelength relationship of the coarse filter and the first and second optical power measurement means far coarse wavelength measurement and from predetermined transmissivity-wavelength relationships of the first and second periodic optical filters and at least one of the third and fourth optical power measurement means for fine wavelength measurement; and
   f) calibration filter means and calibration filter output power measuring means, wherein the calibration filter means comprises an etalon filter,
   wherein free spectral range of the calibration etalon filter differs just sufficiently from the free spectral range of the periodic optical filters that the calibration etalon filter is in phase only at top, middle and bottom wavelengths of a range of measurements of interest to obtain co-incident or Vernier-like maximum power at those wavelengths.

25. A method of determining wavelength of an optical beam comprising:
   a) splitting the optical beam into first, second, third and fourth sub-beams;
   b) presenting the first sub-beam to reference first photodetector means;
   c) presenting the second sub-beam to coarse filter means having an output to second photodetector means;
   d) presenting the third sub-beam to a first fine periodic filter having an output to third photodetector means;
   e) presenting the fourth sub-beam to a second fine periodic filter having an output to fourth photodetector means, wherein the first fine periodic filter and the second fine periodic filter are in quadrature and have a finesse of substantially 2 and free spectral range of substantially 100 GHz, such that peaks and troughs of the first fine periodic filter coincide with substantially linear ranges between peaks and troughs of the second fine periodic filter;
   f) using synchronized clock signal measurement means to read outputs from the first, second, third and fourth photodetector means;
   g) identifying from predetermined transmissivity-wavelength characteristics of the coarse filter means and the first and second photodetector means outputs a limited range of wavelength in which the wavelength of the optical beam lies, to determine from their predetermined transmissivity-wavelength sensitivities which of the first fine filter and the second fine filter has a greater sensitivity to wavelength in that limited range; and
   h) using predetermined transmissivity-wavelength characteristics of the first or second fine filter having the greater sensitivity in the limited range of wavelength and the corresponding third or fourth photodetector means output, corresponding to the fine filter means having the greater sensitivity, to determine the wavelength of the optical beam;
   i) providing a calibration etalon filter with conventional Airy function transmitting only at a reference wavelength for calibration having a common maximum with the first and second fine periodic filters respectively at a limited number of wavelengths within range;
   j) providing a broadband light source; and
   k) calibrating the processed readout from fine periodic filters to the reference wavelength of the calibration etalon filter.

26. A method as claimed in claim 25, wherein step b) comprises providing one of either a broadband light source or a tuneable laser tuned to the reference wavelength.

27. A method as claimed in claim 25, wherein step a) additionally comprises providing a fourth Airy etalon in ratio with the calibration etalon filter with conventional Airy function to provide a common maximum at the limited number of wavelengths for a more defined optical transmitted bandwidth.

* * * * *